Jan. 27, 1970     J. A. LALA ET AL     3,491,430
METHOD OF USING A PRE-FORM STRIP
Filed July 19, 1966

INVENTOR.
HERMAN W. BAER
BY JOSEPH A. LALA

*ATTORNEY*

United States Patent Office 3,491,430
Patented Jan. 27, 1970

3,491,430
METHOD OF USING A PRE-FORM STRIP
Joseph A. Lala, New Monmouth, and Herman W. Baer, Rochelle Park, N.J., assignors to The Bendix Corporation, a corporation of Delaware
Filed July 19, 1966, Ser. No. 566,287
Int. Cl. B23k 35/12
U.S. Cl. 29—501                                   7 Claims

ABSTRACT OF THE DISCLOSURE

Mechanical means for feeding solder preform strips and mounting together with a platform disc on a semiconductor platform.

BACKGROUND OF THE INVENTION

(1) Field of the invention

The invention relates to means and methods of fabricating semiconductor platform assemblies.

(2) Description of the prior art

In soldering a mounting disc on a semiconductor platform a solder preform disc is used. As these preform discs are relatively thin compared to their diameter, it is necessary that the operator place them in position by hand. This is a slow process as the solder preform discs are difficult to pick up. The discs are easily damaged due to bending which will affect further processes.

The present invention provides a method and means for overcoming the aforenoted problems.

SUMMARY OF THE INVENTION

A method utilizing preform solder strips which are fed by mechanical means to a device in which solder discs are cut off and assembled with a mounting on a semiconductor assembly.

The present invention relates to semi-conductor devices and more particularly to means and methods of fabricating such devices.

In the fabrication of semi-conductor devices, the wafers of semi-conductor material are mounted on a copper disc which is secured to a platform by soldering. In soldering the disc to the platform a solder preform disc is utilized. These disc are relatively thin as compared to their diameter, as an example the disc have a thickness of .003 inch and a diameter of $^{11}/_{16}$ inch. The disc also has holes, in a non-symetrical fashion, to enable them to be placed over the protruding pins of the platform. Due to the thinness of the solder disc, it is necessary that the operator place the solder disc by hand into position. This is a slow process as the solder disc are difficult to pick up. Also the disc are easily damaged due to bending by finger action which is undesirable as subsequent process depend upon the initial flatness of the discs. Further, the solder discs have a smaller axial dimension than the required clearance of the present state of the art mechanical feeders.

The present invention provides a preform strip which can be fed by mechanical means to a device in which the solder disc are cut off the strip and assembled on the platform simultaneously.

The above and other objects and features of the invention will appear more fully hereinafter from a consideration of the following description taken in connection with the accompanying drawing wherein one example is illustrated by way of example:

In the drawing

Figure 2:
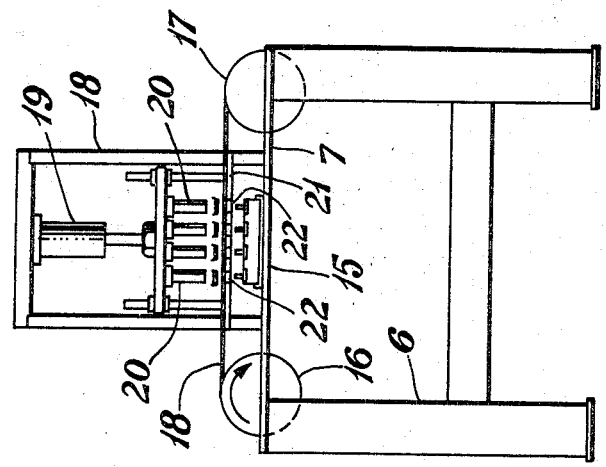
FIGURE 2 is an end sectional view of the device of FIGURE 1.
Figure 1:
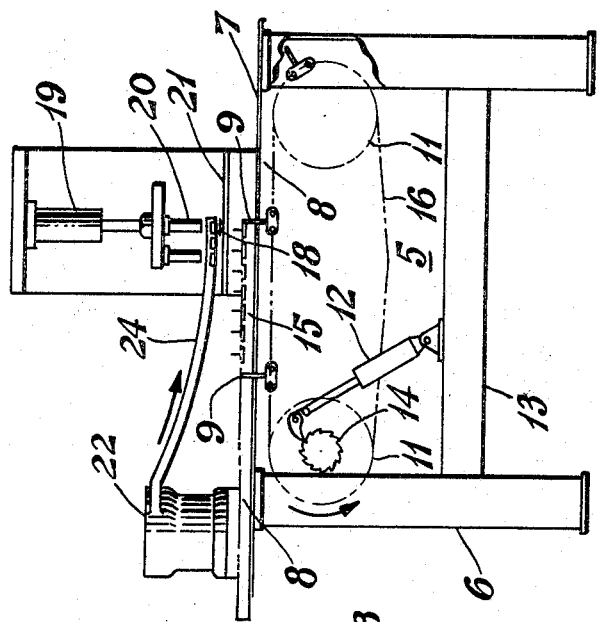
FIGURE 1 is a diagramatical representation of a side sectional view of equipment for carrying out the invention.

Referring now to the drawing wherein like parts in the various figures have been assigned the same reference numerals, a platform assembly machine is indicated generally by the numeral 5. The machine 5 includes supports 6 for a platform 7. The platform 7 has an elongated opening 8 there in adapted to receive pawls 9 spaced at predetermined intervals on a belt or chain 10. The belt 10 is mounted on pulleys 11 which are mounted for rotation in a conventional manner by the supports 6 of the machine 5. A ratchet cylinder 12 mounted on a cross member 13 between the supports 6 is adapted to engage a toothed wheel 14 on one of the pulleys 11 to control the movement of the belt 10 for intermittent feed. The pawls 9 are adapted to engage jigs or boats 15 and move them across the platform 7.

Figure 3:
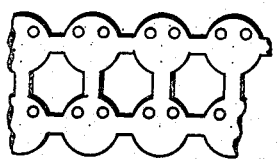
FIGURE 3 is a top view of a solder preform strip utilized in the invention.

Also mounted on the machine 5 are reels 16 and 17 (see FIGURE 2). The reel 16 is adapted to receive a coil of a solder preform strip 18 (FIGURE 3) which is connected across to the other reel 17.

It is an object of the invention to provide an improved method for fabricating semiconductor devices.

Another object of the invention is to provide improved means for fabricating semiconductor devices.

Another object of the invention is to provide improved means for fabricating solder preform disc.

An inserting fixture 18 is supported on the platform 7 and positioned to be in alignment with the strip 18. The fixture 18 includes an inserting cylinder 19 having a plurality of heads 20 and a stripper plate 21. The stripper plate 21 has a plurality of openings 22 to correspond with and register with the heads 20. The inserting cylinder 19 may be hydraulically operated or of any other conventional manner.

Figure 4:
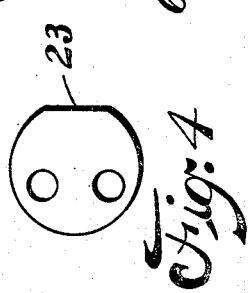
FIGURE 4 is a top view of a cooper disc utilized in the fabrication of transistors.

A feed bowl 22 adapted to feed copper disc 23 (FIGURE 4) is mounted on the platform 7 and has a plurality of chutes or tracks 24 positioned to terminate in register with the heads 20 of the inserting cylinder 19.

In operation the jigs 15 having transistor platforms 25 loaded therein are fed and moved by the pawls 9 into position under the openings 22 in the stripper plate 21. The inserting cylinder 19 is then actuated and the heads 20 press the copper disc 23 down on the strip 18 forcing it through the stripper plate 21 and onto the pins of the transistor platforms 25. The inserting cylinder is actuated and the pawls 9 move the jig on towards a furnace (not shown) and moves another jig into location. After the solder preforms are punched out a strip of material left is taken up on the reel 17.

Thus a method of processing has been provided in which the utilization of the material for the solder preforms is at a maximum and damage reduced to a minimum. This is important as the material normally used has a high silver content and is costly.

Although only one embodiment of the invention has been illustrated and described, various changes in the form and relative arrangement of the parts, which will now appear to those skilled in the art, may be made without departing from the scope of the invention.

What is claimed is:

1. A method of fabricating a platform assembly for a semiconductor device comprising placing at least one transistor platform in a jig, moving said jig into a position in operative relationship with a stripper, feeding a ribbon of solder preform between said jig and said stripper, feeding a disc between said solder preform ribbon and said stripper, and actuating said stripper to press said disc against said preform ribbon to punch out a preform and place said preform and said disc on said platform.

2. The method as set forth in claim 1 in which a stripper plate is positioned between said preform ribbon and said platform.

3. The combination as set forth in claim 1 in which said preform ribbon is provided with predetermined cut-outs.

4. The combination as set forth in claim 1 in which the loaded platform is moved into a furnace.

5. The combination as set forth in claim 1 in which the feed is automatic.

6. The combination as set forth in claim 1 in which the stripper has a plurality of heads.

7. The combination as set forth in claim 1 in which the remainder of the ribbon is taken up on a reel.

References Cited

UNITED STATES PATENTS

| | | | |
|---|---|---|---|
| 2,049,771 | 8/1936 | Gwyn | 29—500 X |
| 2,808,636 | 10/1957 | Vargo et al. | 228—14 X |
| 3,089,449 | 5/1963 | Gutbier | 228—14 X |
| 3,310,388 | 3/1967 | Bennett et al. | 29—501 X |

JOHN F. CAMPBELL, Primary Examiner

J. L. CLINE, Assistant Examiner

029—432